United States Patent
Kang et al.

(10) Patent No.: US 12,308,951 B2
(45) Date of Patent: May 20, 2025

(54) TIME SYNCHRONIZATION METHOD USING 5G REFERENCE TIME DISTRIBUTION AND NETWORK ENTITY PERFORMING THE SAME

(71) Applicant: ELECTRONICS AND TELECOMMUNICATIONS RESEARCH INSTITUTE, Daejeon (KR)

(72) Inventors: Yoo Hwa Kang, Daejeon (KR); Changki Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 280 days.

(21) Appl. No.: 17/886,019

(22) Filed: Aug. 11, 2022

(65) Prior Publication Data
US 2023/0048519 A1    Feb. 16, 2023

(30) Foreign Application Priority Data

Aug. 11, 2021   (KR) .......................... 10-2021-0105746
Aug. 10, 2022   (KR) .......................... 10-2022-0100090

(51) Int. Cl.
*H04J 3/06* (2006.01)
*H04W 56/00* (2009.01)

(52) U.S. Cl.
CPC .......... *H04J 3/0682* (2013.01); *H04J 3/0655* (2013.01); *H04W 56/001* (2013.01); *H04W 56/005* (2013.01)

(58) Field of Classification Search
CPC ... H04J 3/0655; H04J 3/0682; H04W 56/001; H04W 56/005
See application file for complete search history.

(56) References Cited

U.S. PATENT DOCUMENTS

| | | | |
|---|---|---|---|
| 2020/0059829 A1* | 2/2020 | Joseph | H04W 56/001 |
| 2020/0120536 A1* | 4/2020 | Prakash | H04W 72/21 |
| 2020/0329441 A1 | 10/2020 | Ha et al. | |
| 2020/0351804 A1* | 11/2020 | Moon | H04W 56/001 |
| 2020/0404697 A1 | 12/2020 | Yang et al. | |
| 2021/0321487 A1* | 10/2021 | Moon | H04W 76/11 |
| 2022/0046570 A1* | 2/2022 | Moon | H04J 3/0644 |
| 2023/0284077 A1* | 9/2023 | Pateromichelakis | H04L 47/28 370/235 |

FOREIGN PATENT DOCUMENTS

KR    1020200114603 A    10/2020

OTHER PUBLICATIONS

3GPP TS 23.502 V17.1.0 (Jun. 2021), 3rd Generation Partnership Project; Technical Specification Group Services and System Aspects; Procedures for the 5G System (5GS); Stage 2 (Release 17).
S2-215567, 3GPP TSG-SA2 Meeting #146E, Aug. 16,-Aug. 27, 2021.

* cited by examiner

*Primary Examiner* — Alpus Hsu
(74) *Attorney, Agent, or Firm* — Rabin & Berdo, P.C.

(57) ABSTRACT

Provided are a time synchronization method using 5G reference time distribution and a network entity performing the same. The time synchronization method may include receiving, by a time sensitive communication time synchronization function (TSCTSF), a 5G reference time distribution request including time synchronization parameter values from an application function (AF); performing, by the TSCTSF, policy modification; and transmitting, by the TSCTSF, a setting of the 5G reference time distribution to the AF.

20 Claims, 7 Drawing Sheets

| Time Synchronization parameter | Description |
|---|---|
| Time synchronization distribution method | Identifies the time synchronization distribution method requested by AF. Allowed values: IEEE Std 1588 [76] operation (i.e. as a Boundary Clock, peer-to-peer Transparent Clock, or end-to-end Transparent Clock) and transport protocol (Ethernet, UDP over IPv4, or UDP over IPv6), IEEE Std 802.1AS [75] operation, or Access Stratum-based 5G clock sync. |
| PTP Profile | Identifies the PTP profile requested by AF. |
| Grandmaster enabled | Indicates whether AF requests 5GS to act as a grandmaster for PTP or gPTP (depending on the requested Time synchronization distribution method). This is applicable for IEEE Std 1588 [76] or IEEE Std 802.1AS [75] operation. [optional] |
| Grandmaster priority | Indicates a priority used as defaultDS.priority1 when generating Announce message when 5GS acts as (g)PTP GM. [optional] |
| Time Domain | As defined in IEEE Std 1588 [76]. [optional] |
| Temporal Validity Condition | Indicates start-time and stop-time attributes that describe the time period when the time synchronization service is active. [optional] |

| Time Synchronization parameter | Description |
|---|---|
| Time synchronization distribution method | 5G clock sync |
| PTP Profile | |
| Time Domain | |
| Temporal Validity Condition | {Start time, Stop time} |
| Time synchronization Accuracy | accuracy budget Upper bound |

FIG. 7

TIME SYNCHRONIZATION METHOD USING 5G REFERENCE TIME DISTRIBUTION AND NETWORK ENTITY PERFORMING THE SAME

CROSS-REFERENCE TO RELATED APPLICATION

This application claims priority to and the benefit of Korean Patent Application No. 10-2021-0105746 filed in the Korean Intellectual Property Office on Aug. 11, 2021, and Korean Patent Application No. 10-2022-0100090 filed in the Korean Intellectual Property Office on Aug. 10, 2022, the entire contents of which are incorporated herein by reference.

BACKGROUND

(a) Field

The present disclosure relates to a method for requesting a time synchronization service with a 5G clock by an application service to provide a time synchronization service of a 3rd generation partnership project (3GPP) 5G system, and more specifically, to a method for performing activation, modification, and deactivation for a time synchronization service.

(b) Description of the Related Art

In 3GPP SA2, in order to meet the requirements for application of various vertical industries of a 5G system, standardization work of the 5G system supporting time sensitive communication (TSC) started from Rel-16. According to 3GPP TS 23.501 (Rel-16), the 5G system is defined as one logic TSN bridge and supports only interlocking with IEEE TSN. Thereafter, in Rel-17, study work and standardization are in progress so as to accept a time sensitive application service in an environment interlocking with non time sensitive networking (Non-TSN), and additionally provide the time synchronization service for the time sensitive application service.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a time synchronization method capable of providing a time synchronization service to an application service using a 5G system clock and a network entity performing the same.

An example embodiment of the present disclosure provides a time synchronization method using 5G reference time distribution including receiving, by a time sensitive communication time synchronization function (TSCTSF), a 5G reference time distribution request including time synchronization parameter values from an application function (AF); performing, by the TSCTSF, policy modification; and transmitting, by the TSCTSF, a setting of the 5G reference time distribution to the AF.

In some example embodiments, the receiving, by the TSCTSF, of the 5G reference time distribution request from the AF may include receiving, by the TSCTSF, the 5G reference time distribution request from a network exposure function (NEF).

In some example embodiments, the receiving, by the TSCTSF, of the 5G reference time distribution request from the NEF may include receiving the 5G reference time distribution request through an Ntsctsf_ASTI_Create Request.

In some example embodiments, the method may further include transmitting, by the TSCTSF, an Ntsctsf_ASTI_Create Response to the NEF in response to the 5G reference time distribution request.

In some example embodiments, the 5G reference time distribution request may be transmitted from the AF to the NEF through a Nnef_ASTI_Create Request.

In some example embodiments, the performing, by the TSCTSF, of the policy modification may include requesting, by the TSCTSF, a PCF initiated AM Policy Association Modification procedure.

In some example embodiments, the requesting, by the TSCTSF, of the PCF initiated AM Policy Association Modification procedure may include requesting, by the TSCTSF, the PCF initiated AM Policy Association Modification procedure using an Npcf_PolicyAuthorization_Update service.

In some example embodiments, the performing, by the TSCTSF, of the policy modification may include generating, by the TSCTSF, a port management information container (PMIC) and a user plane node management information container (UMIC); and transmitting, by the TSCTSF, the time synchronization parameter values to a device side TSN translator (DS-TT)/network side TSN translator (NW-TT).

In some example embodiments, the method may further include transmitting, by the TSCTSF, time synchronization accuracy information to a radio access network (RAN).

In some example embodiments, the transmitting, by the TSCTSF, of the time synchronization accuracy information to the RAN may include transmitting, by the TSCTSF, the time synchronization accuracy information to the RAN using an Ndur_DM_Create/Update/Delete service.

In some example embodiments, the time synchronization accuracy information may be transmitted from a UDR to a policy control function (PCF) through Ndur_DM_Notify, and the time synchronization accuracy information transmitted to the PCF may be transmitted to an access and mobility management function (AMF) through an AM Policy association modification procedure.

In some example embodiments, the time synchronization accuracy information transmitted to the AMF may be transmitted to the RAN.

In some example embodiments, the transmitting, by the TSCTSF, of the setting of the 5G reference time distribution to the AF may include transmitting, by the TSCTSF, the setting of the 5G reference time distribution to the NEF.

In some example embodiments, the transmitting, by the TSCTSF, of the setting of the 5G reference time distribution to the NEF may include transmitting, by the TSCTSF, the setting of the 5G reference time distribution to the NEF through Ntsctsf_ASTI_Create/Update/Delete/Get Response.

Another example embodiment of the present disclosure provides a network entity of performing a time synchronization method using 5G reference time distribution including: a network interface configured to transmit and receive data with other network entities; and a processor configured to receive a 5G reference time distribution request including time synchronization parameter values from an AF, perform policy modification, and transmit a setting of the 5G reference time distribution to the AF.

In some example embodiments, the performing of the policy modification may include requesting a PCF initiated AM Policy Association Modification procedure.

In some example embodiments, the performing of the policy modification may include generating a PMIC and a UMIC and transmitting the time synchronization parameter values to a DS-TT/NW-TT.

In some example embodiments, the processor may transmit time synchronization accuracy information to an RAN.

In some example embodiments, the transmitting of the time synchronization accuracy information to the RAN may include transmitting the time synchronization accuracy information to the RAN using an Ndur_DM_Create/Update/Delete service.

In some example embodiments, the time synchronization accuracy information may be transmitted to a UDR through Ndur_DM_Notify, the time synchronization accuracy information transmitted to the PCF may be transmitted to the AMF through an AM Policy association modification procedure, and the time synchronization accuracy information transmitted to the AMF may be transmitted to the RAN.

According to an embodiment of the present disclosure, since the application service may request the time synchronization service using the 5G system clock as the grandmaster clock, it is possible to provide the time synchronization service using only the 5G system clock even when a separate grandmaster clock is not provided.

DETAILED DESCRIPTION OF THE EMBODIMENTS

The present invention will be described more fully hereinafter with reference to the accompanying drawings, in which example embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise", and variations such as "comprises" or "comprising", will be understood to imply the inclusion of stated elements but not the exclusion of any other elements.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

Figure 1:
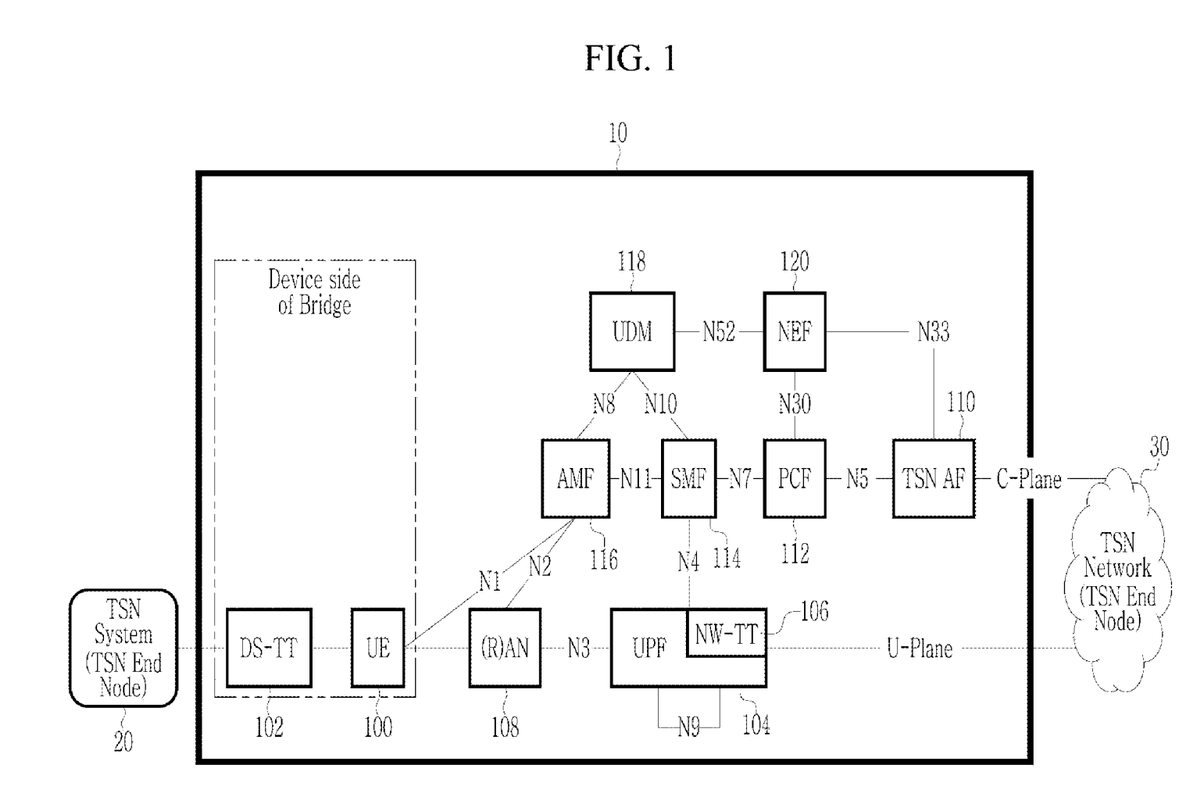
FIG. 1 is a diagram for describing a 5G system architecture for supporting TSC and time synchronization services interlocking with a time sensitive networking (TSN) network according to an example embodiment.

FIG. 1 is a diagram for describing a 5G system architecture for supporting TSC and time synchronization services interlocking with a time sensitive networking (TSN) network according to an example embodiment.

Referring to FIG. 1, the 5G system architecture for supporting the TSC and time synchronization services interlocking with the TSN network may include a 5G system 10 operating as a logic TSN bridge, a TSN system 20 as a TSN end node performing communication by transmitting and receiving data with each other using the 5G system 10 as the TSN bridge, and a TSN network 30.

The architecture of FIG. 1 is an architecture extended to support the TSC in the 5G system 10. The 5G system 10 operates as the TSN bridge for integration with an external TSN network, and additionally includes translators (TTs) 102 and 106 and a TSN application function (AF) 110 in an existing architecture including UE 100, a UPF 104, a radio access network (RAN) 108, a policy control function (PCF) 112, an SMF 114, an access and mobility management function (AMF) 116, a unified data management (UDM) 118 and a network exposure function (NEF) 120 for communication with the TSN network. The TSN translators 102 and 106 for interlocking with the TSN network include a DS-TT 102 and a NW-TT 106, and each of the DS-TT 102 and the NW-TT 106 has transmission and reception ports for communicating with the TSN network. In addition, in addition to the translators in a user plane, the TSN AF 110 in a control plane communicates with a centralized network configuration (CNC) of the TSN network to transmit and receive control information between the 5G system and the TSN network, and the NEF 120 has a function of exposing services for the 5G network.

Figure 2:
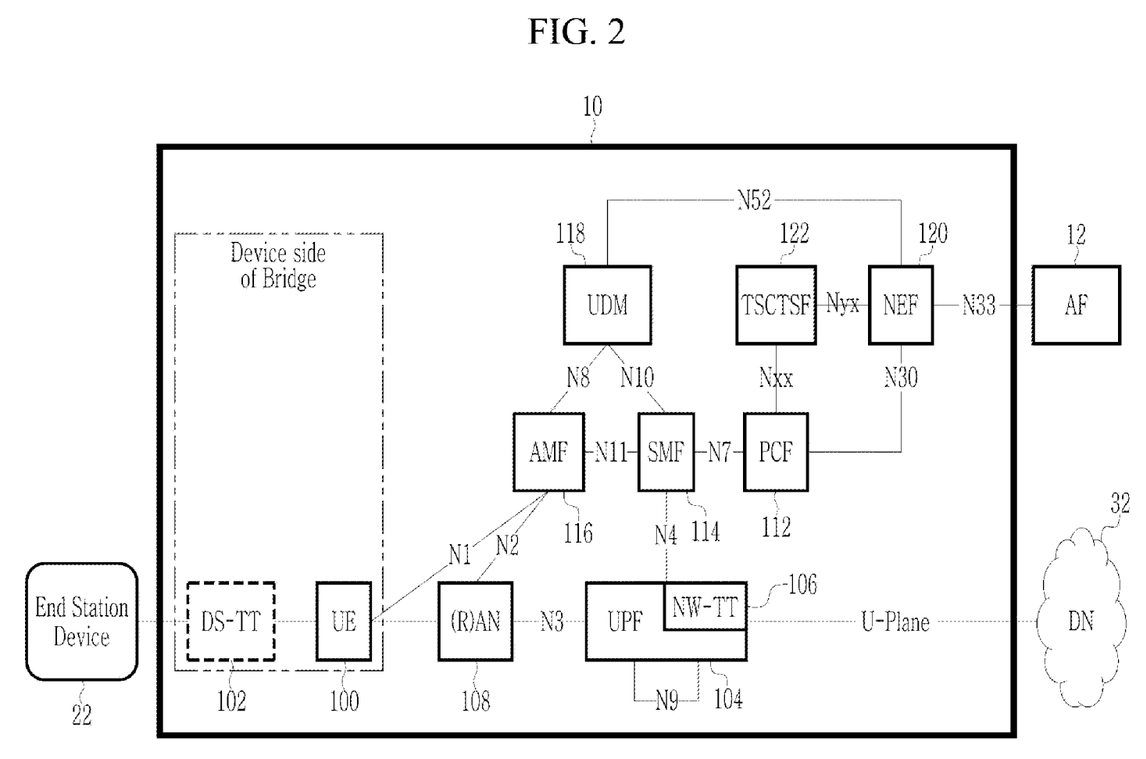
FIG. 2 is a diagram for describing a 5G system architecture for supporting TSC and time synchronization services interlocking with a Non-TSN network according to an example embodiment.

FIG. 2 is a diagram for describing a 5G system architecture for supporting TSC and time synchronization services interlocking with a Non-TSN network according to an example embodiment.

Referring to FIG. 2, the 5G system architecture for supporting the TSC and time synchronization services interlocking with the Non-TSN network extends from the 5G system architecture having the TSN network interlocking structure of FIG. 1 so as to support a time synchronization service of the 5G system even to an application service in an environment interlocking with the Non-TSN network and to provide a TSC service using the same.

To this end, a function for the 5G system to expose the time synchronization service to external application services and a function for each of the application services to provide time synchronization service requirements to the 5G system are provided. In addition, the external application service may acquire 5G system time synchronization capability information exposed from the NEF 120 of the 5G system through an AF 12 and is also provided with a function to set the time synchronization requirements required for the corresponding service to the 5G system through the NEF 120 within the range of the capability information exposed by the 5G system.

To this end, as illustrated in FIG. 2, the structure of the 5G system is a structure in which in a 5G system time synchronization service function, a TSCTSF 122, which is a functional entity dedicated to the time synchronization service, is separated from the NEF 120 having the exposure function. That is, the functions thereof are separated so that the NEF 120 performs the exposure function, and the TSCTSF 122 performs the time synchronization service provisioning function.

Hereinafter, a time synchronization method capable of providing a time synchronization service to an application service using a 5G system clock in such an architecture will be described.

Figure 3:
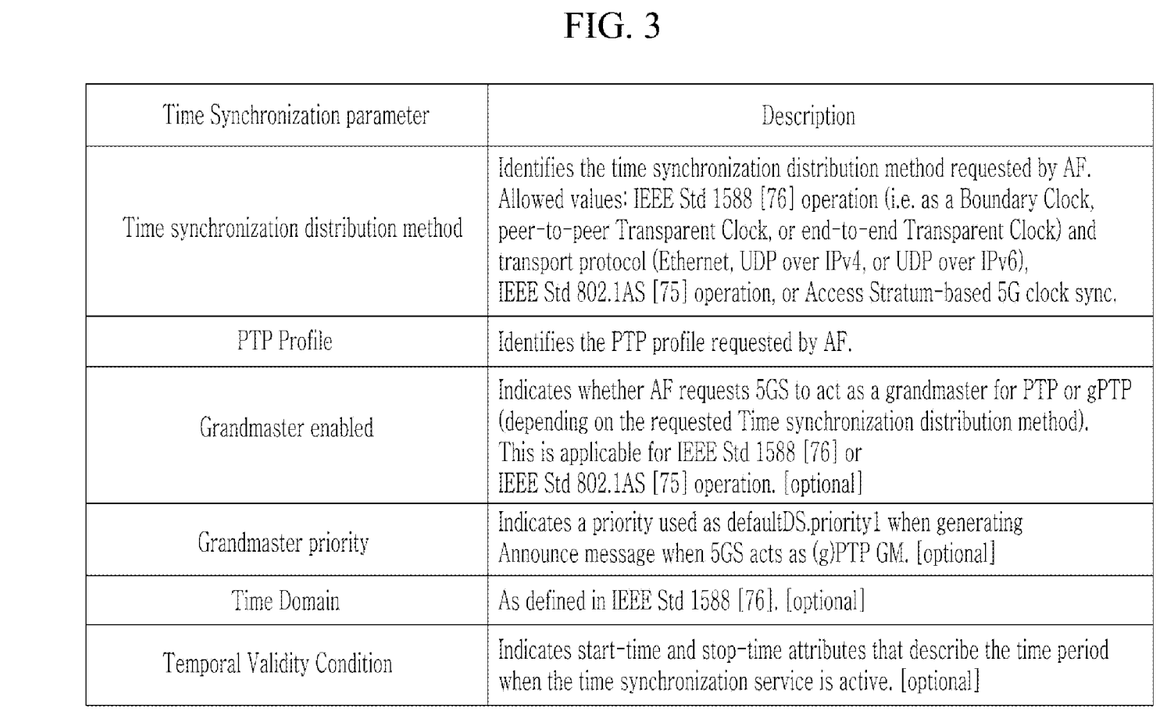
FIG. 3 is a diagram for describing time synchronization parameters to be transmitted from the 5G system architecture according to an example embodiment.

FIG. 3 is a diagram for describing time synchronization parameters to be transmitted from the 5G system architecture according to an example embodiment.

Referring to FIG. 3, time synchronization parameters transmitted from the 5G system architecture according to the example embodiment include Time synchronization distribution method, Precision Time Protocol (PTP) Profile, Grandmaster enabled, Grandmaster priority, Time Domain, and Temporal validity Condition The time synchronization parameters may be used for the AF 12 to request activation, modification, and deactivation of the time synchronization service to the 5G system in order to provide the time synchronization service to an external application service.

Specifically, the Time synchronization distribution method is a parameter for identifying the time synchronization distribution method requested by the AF 12, the PTP profile is a parameter for identifying the PTP Profile requested by the AF 12, and the Grandmaster enabled is a parameter for whether to request the 5G system to act as a GM of PTP or gPTP according to the time synchronization distribution method requested by the AF 12. In addition, the Grandmaster priority is a parameter indicating a priority used as defaultDS.priority1 when generating an Announce message when the 5G system acts as (g)PTP GM, and the Time Domain is a parameter as defined in IEEE Std 1588, and the Temporal validity Condition is a parameter indicating a start time and a stop time when the time synchronization service is activated.

The time synchronization parameters transmitted from the 5G system architecture according to the example embodiment extend not only to a case of using IEEE 1588 and IEEE 802.1AS clocks according to the TS 23.502 standard, but also to a case of requesting the time synchronization service using the 5G clock. That is, according to the time synchronization method according to the example embodiments, the application service may request the time synchronization service by using the 5G system clock as a grandmaster clock in addition to requesting the time synchronization service using the IEEE 1588 and IEEE 802.1AS clocks.

Figure 4:
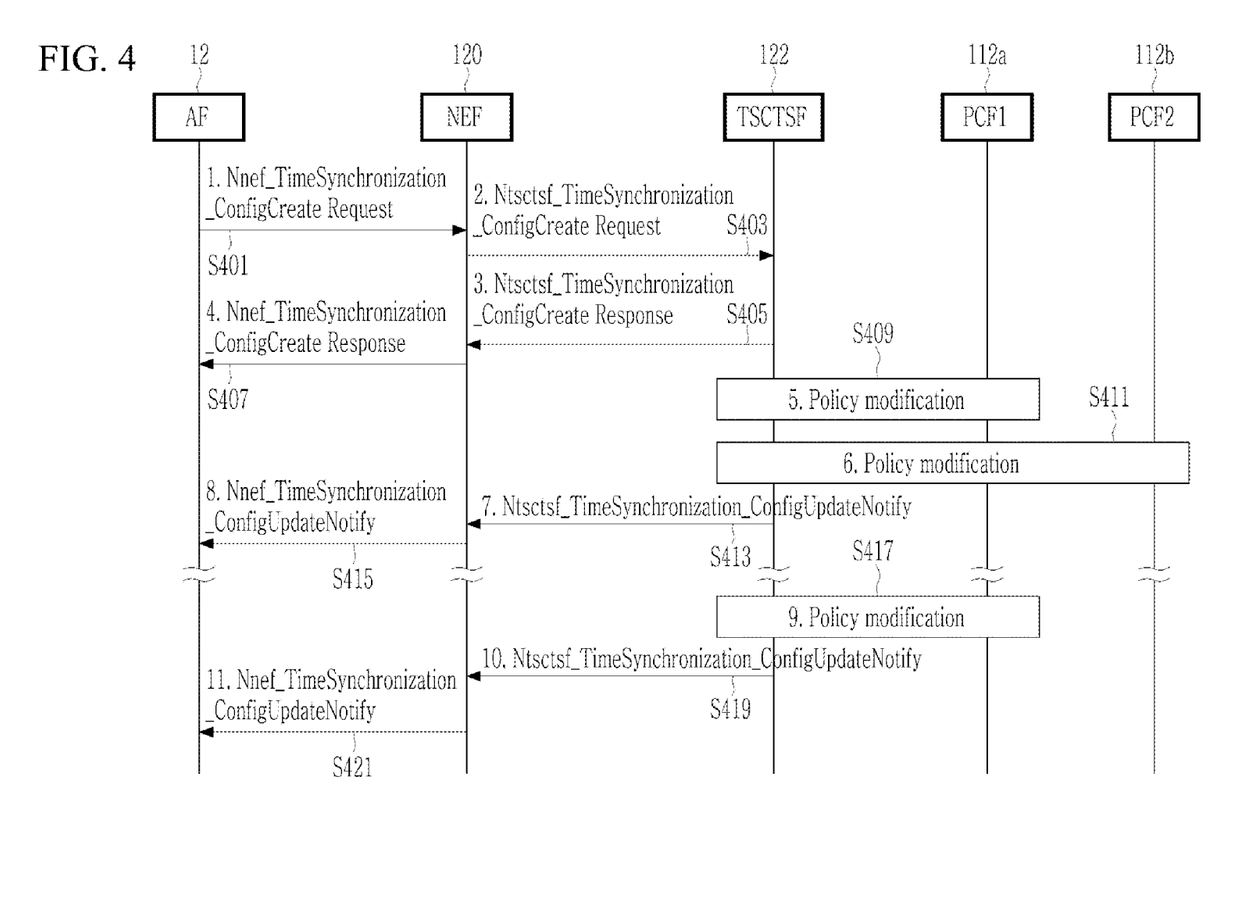
FIG. 4 is a diagram for describing a time synchronization method of providing a time synchronization service to an application service using time synchronization parameters according to an example embodiment.

FIG. 4 is a diagram for describing a time synchronization method of providing a time synchronization service to an application service using time synchronization parameters according to an example embodiment.

Referring to FIG. 4, according to the TS 23.502 standard, the time synchronization parameters requested by the AF 12 may follow a Nnef_TimeSynchronization_ConfigCreate/ Update/UpdateNotify procedure in the 3GPP 5G system.

Specifically, the AF 12 may transmit an Nnef_TimeSynchronization_ConfigCreate Request to the NEF 120 (S401) and the NEF 120 may transmit an Ntsctsf_TimeSynchronization_ConfigCreate Request to the TSCTSF 122 (S403). At this time, the time synchronization parameters may be transmitted from the AF 12 to the TSCTSF 122 via the NEF 120. In response thereto, the TSCTSF 122 may transmit an Ntsctsf_TimeSynchronization_ConfigCreate Response to the NEF 120 (S405), and the NEF 120 may transmit an Nnef_TimeSynchronization_ConfigCreate Response to the AF 12 (S407). Accordingly, the time synchronization service for the application service may be set.

Thereafter, policy modification may be made between the TSCTSF 122 and a first PCF 112a (S409), or policy modification may be made between the TSCTSF 122 and a second PCF 112b (S411). According to the policy modification, the time synchronization service for the application service may be updated. Specifically, after the policy modification is made, the TSCTSF 122 may transmit Ntsctsf- _TimeSynchronization_ConfigUpdateNotify to the NEF 120 (S413), and the NEF 120 may transmit Nnef_TimeSynchronization_ConfigUpdateNotify to the AF 12 (S415). Accordingly, it is possible to notify the AF 12 and the NEF 120 that the time synchronization service for the application service is set.

Thereafter, policy modification may be additionally made between the TSCTSF 122 and the first PCF 112a (S417). According to additional policy modification, the time synchronization service for the application service may be additionally updated. Specifically, after the policy modification is made, the TSCTSF 122 may transmit Ntsctsf_ TimeSynchronization_ConfigUpdateNotify to the NEF 120 (S419), and the NEF 120 may transmit Nnef_TimeSynchronization_ConfigUpdateNotify to the AF 12 (S421). Accordingly, it is possible to notify the AF 12 and the NEF 120 that the time synchronization service for the application service is set according to the modified policy.

In accordance with the TS 23.502 standard, the time synchronization parameters extending not only to the case of using the IEEE 1588 and IEEE 802.1AS clocks, but also to the case of requesting the time synchronization service using the 5G clock may be transmitted between the network entities via an Nnef_TimeSynchronization_ConfigCreate/ Update/UpdateNotify procedure as described above.

Figure 5:
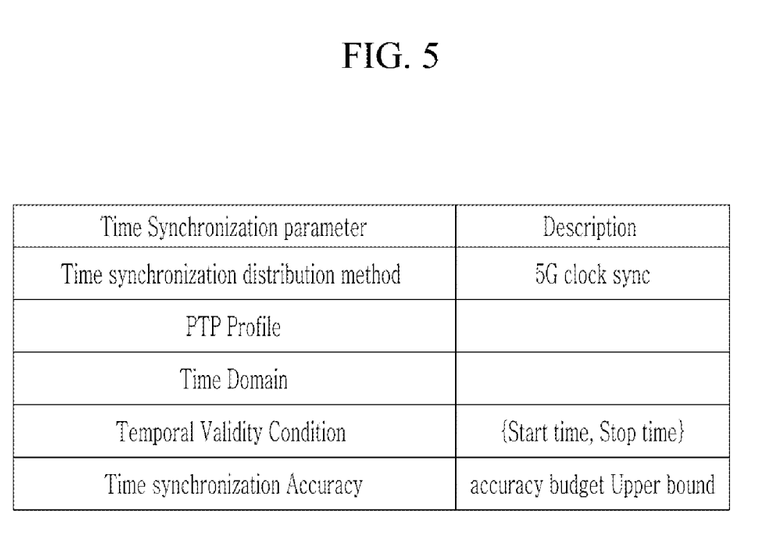
FIG. 5 is a diagram for describing time synchronization parameters to be transmitted from the 5G system architecture according to an example embodiment.

FIG. 5 is a diagram for describing time synchronization parameters to be transmitted from the 5G system architecture according to an example embodiment.

Referring to FIG. 5, time synchronization parameters are defined to request the time synchronization service using the 5G clock as the grandmaster clock through the AF 12, that is, to request activation, modification, and deactivation of the time synchronization service. These time synchronization parameters may be used by AF 12 to request 5G reference time distribution. A unit of requesting the 5G reference time distribution may be one UE, a group of UEs using DNN/S-NSSAI, or any UE.

The AF 12 may set a 5G clock sync value in the Time synchronization distribution method to request the 5G clock to be used as the grandmaster clock of the corresponding time domain. In addition, the use of the 5G clock may be activated or deactivated by setting the Time synchronization distribution method value differently. The Temporal Validity Condition may indicate a start time and a stop time of the service, may indicate a time when the time synchronization service is activated, and may be requested by the AF 12. The Time synchronization Accuracy is an accuracy value for the 5G clock requested by the AF 12 and may be expressed as an upper bound of an accuracy budget.

Figure 6:
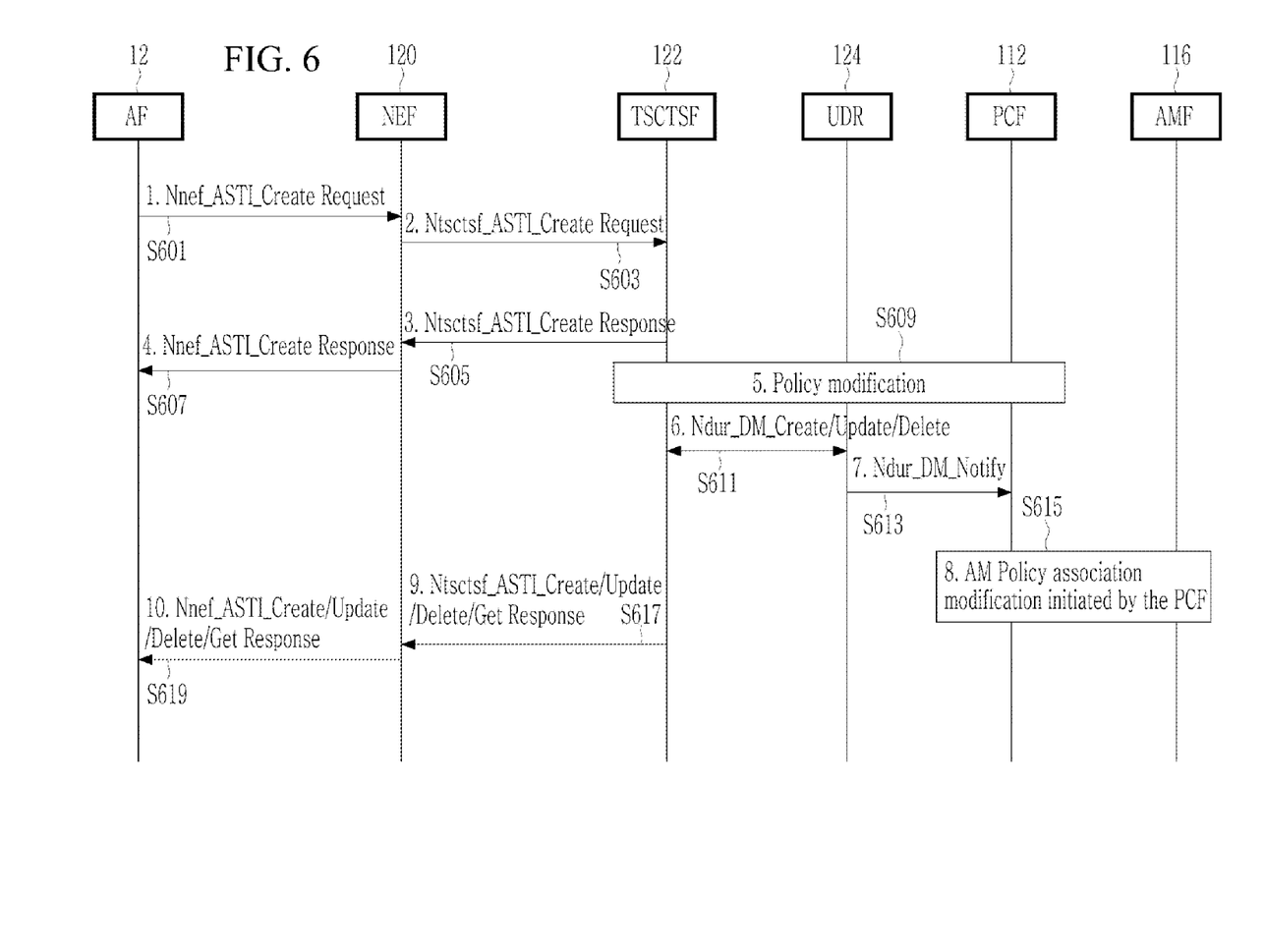
FIG. 6 is a diagram for describing a time synchronization method of providing a time synchronization service to an application service using time synchronization parameters according to an example embodiment.

FIG. 6 is a diagram for describing a time synchronization method of providing a time synchronization service to an application service using time synchronization parameters according to an example embodiment.

Referring to FIG. 6, a request procedure is illustrated to request the time synchronization service using the 5G clock as the grandmaster clock by the application service through the AF 12, that is, to request activation, modification, and deactivation of the time synchronization service. That is, it is illustrated a procedure of requesting activation, modification, and deactivation of the 5G reference time distribution by the AF 12 using the service parameter values defined in FIG. 5.

Specifically, the AF 12 may transmit the service parameters defined in FIG. 5 to the NEF 120 through an Nnef_ASTI_Create Request to request the 5G reference time distribution (S601), and the NEF 120 may transmit the service parameters through an Ntsctsf_ASTI_Create Request to the TSCTSF 122 (S603). In response thereto, the TSCTSF 122 may transmit an Ntsctsf_ASTI_Create Response to the NEF 120 (S605), and the NEF 120 may transmit an Nnef_ASTI_Create Response to the AF 12 (S607). In some example embodiments, the AF 12 may also directly request 5G reference time distribution service parameters to the TSCTSF 122.

Next, policy modification may be made between the TSCTSF 122, a unified data repository (UDR) 124 and a PCF 112 (S609). Specifically, the TSCTSF 122 may request or perform a PCF initiated AM Policy Association Modification procedure using an Npcf_PolicyAuthorization_Update service. In addition, the TSCTSF 122 may generate a port management information container (PMIC), and a user plane node management information container (UMIC), and as a result, may transmit time synchronization parameter values to the device side TSN translator (DS-TT) 102/ network side TSN translator (NW-TT) 106.

Next, the TSCTSF 122 may use an Ndur_DM_Create/ Update/Delete service (S611) to transmit time synchronization accuracy information (the time synchronization accuracy of FIG. 5) to an RAN 108 (S611), and the UDR 124 may notify the time synchronization accuracy information to the PCF 112 using Ndur_DM_Notify. Thereafter, the PCF 112 may transmit the time synchronization accuracy information to an AMF 116 through an AM Policy association modification procedure, and the AMF 116 may transmit the accuracy information to the RAN 106.

Next, the TSCTSF 122 may transmit a setting of the 5G reference time distribution to the NEF 120 through Ntsctsf_ASTI_Create/Update/Delete/Get Response (S617), and the NEF 120 may transmit the setting of the 5G reference time distribution to the AF 12 through Ntsctsf_ASTI_Create/Update/Delete/Get Response (S619).

Figure 7:
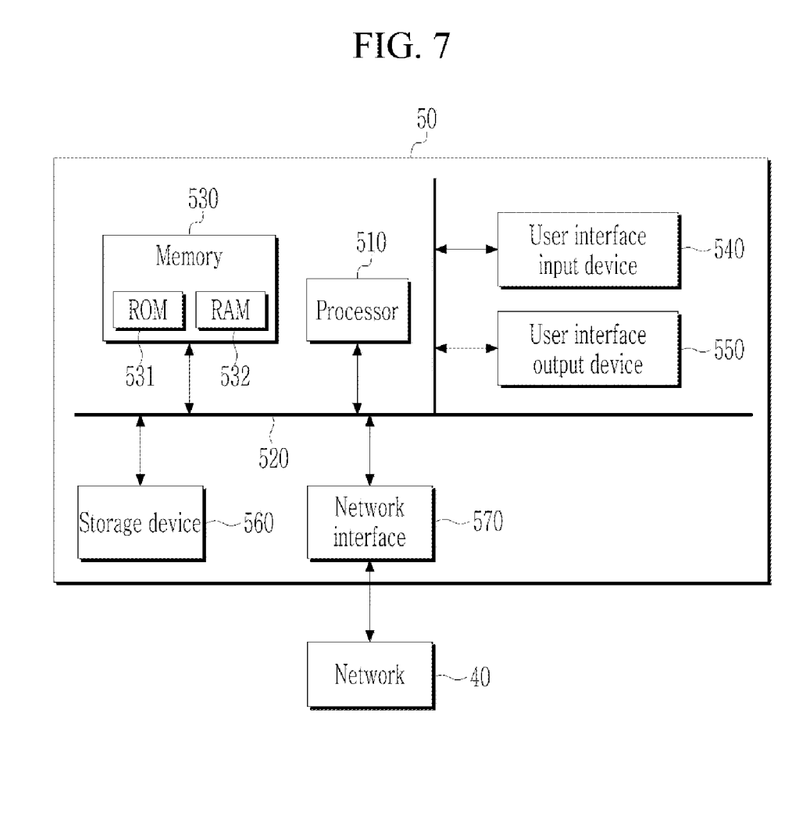
FIG. 7 is a diagram for describing a computing device according to an example embodiment.

FIG. 7 is a diagram for describing a computing device according to an example embodiment.

Referring to FIG. 7, a computing device 50 may be network entities of the 5G system, for example, the UE 100, the DS-TT 102, the UPF 104, the NW-TT 106, the RAN 108, the TSN AF 110, the PCF 112, the SMF 114, the AMF 116, the UDM 118, the NEF 120, the TSCTSF 122, the UDR 124, and the like. In addition, the time synchronization method using 5G reference time distribution according to example embodiments and the network entity performing the same may be implemented using the computing device 50.

The computing device 50 may include at least one of a processor 510, a memory 530, a user interface input device 540, a user interface output device 550, and a storage device 560, which communicate via a bus 520. The computing device 50 may also include a network interface 570 electrically connected to a network 40, such as a wireless network.

The network interface 570 may transmit or receive signals with other network entities via the network 40.

The processor 510 may be implemented in various types such as an application processor (AP), a central processing unit (CPU), a graphic processing unit (GPU), and the like, and may be any semiconductor device executing instructions stored in the memory 530 or the storage device 560. The processor 510 may be configured to implement the functions and the methods described in FIGS. 1 to 6.

The memory 530 and the storage device 560 may include various types of volatile or non-volatile storage media. For example, the memory may include a read-only memory (ROM) 531 and a random access memory (RAM) 532. In an example embodiment, the memory 530 may be located inside or outside the processor 510, and the memory 530 may be connected to the processor 510 through various known means.

In addition, the time synchronization method using the 5G reference time distribution according to the example embodiments and the network entity performing the same may be implemented with programs or software executed in the computing device 50, and the programs or software may be stored in computer-readable media.

In addition, the time synchronization method using the 5G reference time distribution according to the example embodiments and the network entity performing the same may also be implemented with hardware capable of being electrically connected to the computing device 50.

In particular, the network entities such as the UE 100, the DS-TT 102, the UPF 104, the NW-TT 106, the RAN 108, the TSN AF 110, the PCF 112, the SMF 114, the AMF 116, the UDM 118, the NEF 120, the TSCTSF 122, and the UDR 124 may perform the operations described with reference to FIGS. 1 to 6.

For example, the network entity (i.e., the TSCTSF 122) according to an example embodiment may include a network interface which transmits and receives data with other network entities; and a processor which receives a 5G reference time distribution request including time synchronization parameter values from the AF 12, performs the policy modification, and transmits the setting of the 5G reference time distribution to the AF 12.

According to the example embodiments described so far, since the application service may request the time synchronization service using the 5G system clock as the grandmaster clock, it is possible to provide the time synchronization service using only the 5G system clock even when a separate grandmaster clock is not provided.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

Although the example embodiment of the present disclosure has been described in detail hereinabove, the scope of the present disclosure is not limited thereto. That is, several modifications and alterations made by a person of ordinary skill in the art using a basic concept of the present disclosure as defined in the claims fall within the scope of the present disclosure.

What is claimed is:

1. A time synchronization method using 5G reference time distribution comprising:
   receiving, by a time sensitive communication time synchronization function (TSCTSF), a 5G reference time distribution request including time synchronization parameter values from an application function (AF);
   performing, by the TSCTSF, policy modification; and
   transmitting, by the TSCTSF, a setting of the 5G reference time distribution to the AF based on the policy modification.

2. The time synchronization method of claim 1, wherein:
   the receiving, by the TSCTSF, of the 5G reference time distribution request from the AF comprises
   receiving, by the TSCTSF, the 5G reference time distribution request from a network exposure function (NEF).

3. The time synchronization method of claim 2, wherein:
   the receiving, by the TSCTSF, of the 5G reference time distribution request from the NEF comprises
   receiving the 5G reference time distribution request through an Ntsctsf_Access Stratum Time Distribution Create Request (Ntsctsf_ASTI_Create Request).

4. The time synchronization method of claim 3, further comprising:
   transmitting, by the TSCTSF, an Ntsctsf_ASTI_Create Response to the NEF in response to the 5G reference time distribution request.

5. The time synchronization method of claim 3, wherein:
   the 5G reference time distribution request is transmitted from the AF to the NEF through an Nnef_ASTI_Create Request.

6. The time synchronization method of claim 1, wherein:
   the performing, by the TSCTSF, of the policy modification comprises
   requesting, by the TSCTSF, a policy control function (PCF) initiated access and mobility management (AM) Policy Association Modification procedure.

7. The time synchronization method of claim 6, wherein:
the requesting, by the TSCTSF, of the PCF initiated AM Policy Association Modification procedure comprises
requesting, by the TSCTSF, the PCF initiated AM Policy Association Modification procedure using an Npcf_PolicyAuthorization_Update service.

8. The time synchronization method of claim 6, wherein:
the performing, by the TSCTSF, of the policy modification comprises
generating, by the TSCTSF, a port management information container (PMIC) and a user plane node management information container (UMIC); and
transmitting, by the TSCTSF, the time synchronization parameter values to a device side time sensitive networking (TSN) translator (DS-TT)/network side TSN translator (NW-TT).

9. The time synchronization method of claim 1, further comprising:
transmitting, by the TSCTSF, time synchronization accuracy information to a radio access network (RAN).

10. The time synchronization method of claim 9, wherein:
the transmitting, by the TSCTSF, of the time synchronization accuracy information to the RAN comprises
transmitting, by the TSCTSF, the time synchronization accuracy information to the RAN using an Ndur_Data_Management_Create (Ndur_DM_Create)/Update/Delete service.

11. The time synchronization method of claim 10, wherein:
the time synchronization accuracy information is transmitted from a unified data repository (UDR) to a policy control function (PCF) through Ndur_DM_Notify, and
the time synchronization accuracy information transmitted to the PCF is transmitted to an access and mobility management function (AMF) through an access and mobility management (AM) policy association modification procedure.

12. The time synchronization method of claim 11, wherein:
the time synchronization accuracy information transmitted to the AMF is transmitted to the RAN.

13. The time synchronization method of claim 1, wherein:
the transmitting, by the TSCTSF, of the setting of the 5G reference time distribution to the AF comprises
transmitting, by the TSCTSF, the setting of the 5G reference time distribution to the NEF.

14. The time synchronization method of claim 13, wherein:
the transmitting, by the TSCTSF, of the setting of the 5G reference time distribution to the NEF comprises
transmitting, by the TSCTSF, the setting of the 5G reference time distribution to the NEF through Ntsctsf_ASTI_Create/Update/Delete/Get Response.

15. A network entity of performing a time synchronization method using 5G reference time distribution comprising:
a network interface configured to transmit and receive data with other network entities; and
a processor configured to receive a 5G reference time distribution request including time synchronization parameter values from an application function (AF), perform policy modification, and transmit a setting of the 5G reference time distribution to the AF.

16. The network entity of claim 15, wherein:
the performing of the policy modification comprises
requesting a policy control function (PCF) initiated access and mobility management (AM) Policy Association Modification procedure.

17. The network entity of claim 16, wherein:
the performing of the policy modification comprises
generating a port management information container (PMIC) and a user plane node management information container (UMIC) and transmitting the time synchronization parameter values to a device side time sensitive networking (TSN) translator (DS-TT)/network side TSN translator (NW-TT).

18. The network entity of claim 17, wherein:
the processor transmits time synchronization accuracy information to a radio access network (RAN).

19. The network entity of claim 18, wherein:
the transmitting of the time synchronization accuracy information to the RAN comprises transmitting the time synchronization accuracy information to the RAN through an Ndur_Data_Management_Create (Ndur_DM_Create)/Update/Delete service.

20. The network entity of claim 19, wherein:
the time synchronization accuracy information is transmitted to a unified data repository (UDR) through Ndur_DM_Notify,
the time synchronization accuracy information transmitted to the PCF is transmitted to the AMF through an AM Policy association modification procedure, and
the time synchronization accuracy information transmitted to the AMF is transmitted to the RAN.

* * * * *